(12) United States Patent
Park et al.

(10) Patent No.: US 9,360,232 B2
(45) Date of Patent: Jun. 7, 2016

(54) FLUIDIZED BED HEAT EXCHANGE APPARATUS FOR RECOVERING HEAT OF FLUE GAS FOR PRODUCING HIGH TEMPERATURE WATER

(71) Applicant: KOREA INSTITUTE OF ENERGY RESEARCH, Daejeon (KR)

(72) Inventors: Sang-Il Park, Daejeon (KR); Kyoung-Bin Choi, Daejeon (KR); Chang-Bok Ko, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 362 days.

(21) Appl. No.: 13/733,968

(22) Filed: Jan. 4, 2013

(65) Prior Publication Data

US 2014/0053792 A1  Feb. 27, 2014

(30) Foreign Application Priority Data

Aug. 23, 2012  (KR) .................. 10-2012-0092069

(51) Int. Cl.
| | |
|---|---|
| *F28D 13/00* | (2006.01) |
| *F24H 1/20* | (2006.01) |
| *F28D 21/00* | (2006.01) |
| *F23J 15/06* | (2006.01) |

(52) U.S. Cl.
CPC ............... *F24H 1/205* (2013.01); *F23J 15/06* (2013.01); *F28D 13/00* (2013.01); *F28D 21/0003* (2013.01); *F24D 2200/18* (2013.01); *Y02E 20/363* (2013.01)

(58) Field of Classification Search
CPC ..... F24H 1/205; F28D 13/00; F22B 31/0092; F23C 2206/101
USPC ................ 122/20, 4 D, 20 A; 165/104.16, 4, 165/104.13; 110/245; 432/58
See application file for complete search history.

(56) References Cited

U.S. PATENT DOCUMENTS

| | | | | | |
|---|---|---|---|---|---|
| 2,884,373 | A | * | 4/1959 | Bailey | 208/132 |
| 5,232,586 | A | * | 8/1993 | Malone | 210/151 |
| 5,398,497 | A | * | 3/1995 | Suppes | 60/775 |
| 5,537,941 | A | * | 7/1996 | Goidich | 110/348 |
| 2003/0140653 | A1 | * | 7/2003 | Fuentes et al. | 62/651 |

FOREIGN PATENT DOCUMENTS

| | | | | |
|---|---|---|---|---|
| KR | 100213303 B1 * | 5/1999 | | F28D 1/00 |
| KR | 10-0213303 B1 | 8/1999 | | |
| KR | 10-0242226 B1 | 3/2000 | | |
| KR | 10-2012-0020810 A | 3/2012 | | |
| KR | 10-1118509 B1 | 3/2012 | | |

* cited by examiner

*Primary Examiner* — Alissa Tompkins
*Assistant Examiner* — John Bargero
(74) *Attorney, Agent, or Firm* — Rabin & Berdo, P.C.

(57) ABSTRACT

A fluidized bed heat exchange apparatus of a flue gas heat recovery type for producing high temperature water. The fluidized bed heat exchange apparatus passes a waste heat of a combustion flue gas containing a high temperature water vapor emitted from a combustion apparatus subsequently through a water fluidized bed and a heat medium fluidized bed such that a hot water at a saturation temperature of a wet air produced from a latent heat of the combustion flue gas at the water fluidized bed is again heated at the heat medium fluidized bed which does not have a vapor condensation phenomenon, thereby producing a hot water at a temperature higher than the saturation temperature of the wet air.

6 Claims, 1 Drawing Sheet

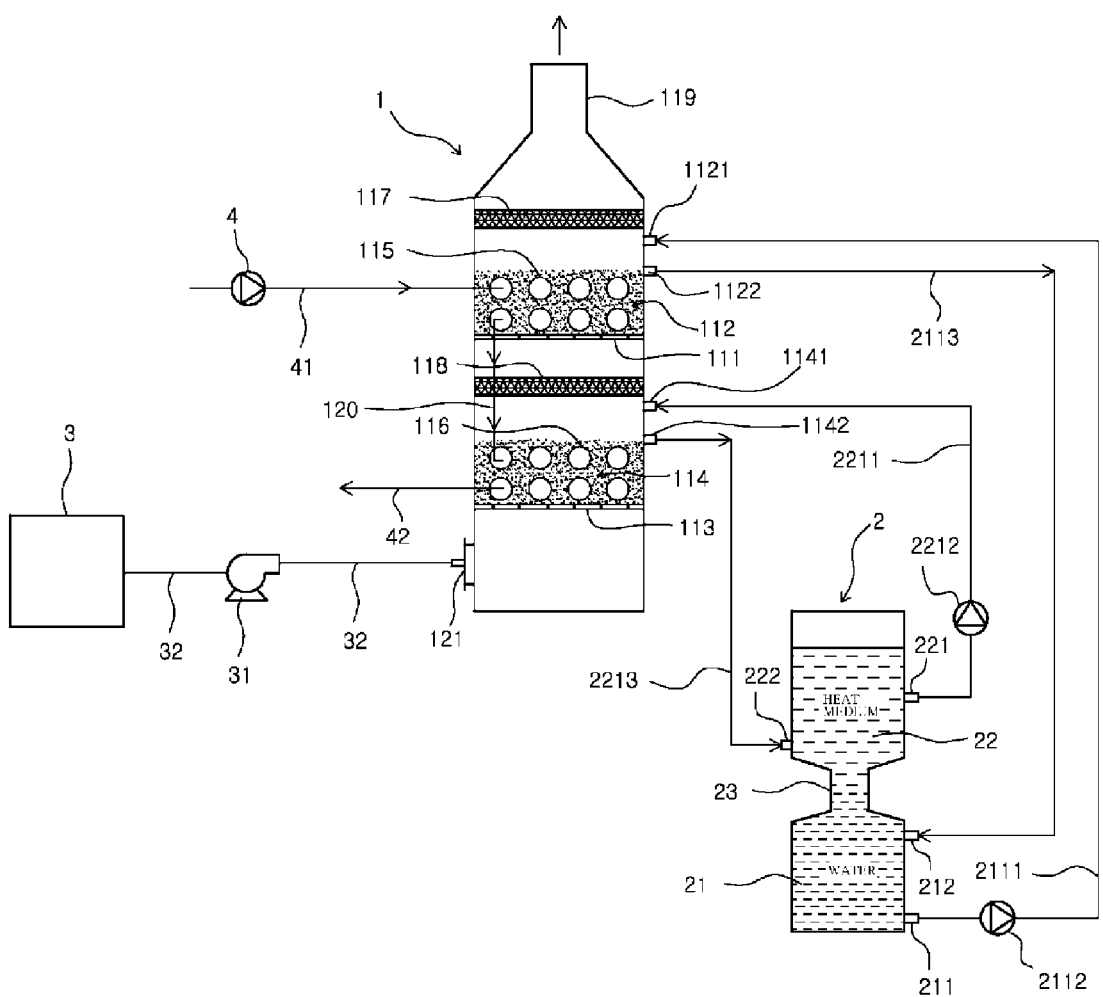

FLUIDIZED BED HEAT EXCHANGE APPARATUS FOR RECOVERING HEAT OF FLUE GAS FOR PRODUCING HIGH TEMPERATURE WATER

BACKGROUND OF THE INVENTION

1. Field of the Invention

The present invention relates to a fluidized bed heat exchange apparatus of a flue gas heat recovery type for producing a high temperature water, and more particularly, to a fluidized bed heat exchange apparatus which recovers a waste heat of a flue gas containing a large amount of a water vapor emitted from a combustion apparatus and, in order to produce a high temperature water, forms a water fluidized bed and a heat medium fluidized bed in a multi-layer to first raise a temperature of a supply water of a low temperature in an upper water fluidized bed and secondly produce a water of a high temperature equal to or higher than 80° C. in a lower heat medium fluidized bed.

2. Description of the Related Art

Typically, a heat exchanger is installed to recover a waste heat from a flue gas of a high temperature emitted from a combustion furnace or a combustion apparatus installed at various industry sites.

However, in a general heat exchanger provided with a high temperature flue gas and a direct heat transfer tube for heat exchange, a contaminant material and a corrosive gas component contained within the flue gas are accumulated on a surface of the heat transfer tube of the heat exchanger, thereby reducing heat transfer efficiency and, in a severe case, a fuel passage of the flue gas may be blocked, and further, a low temperature corrosion phenomenon of a surface material of the heat transfer tube may occur due to a contaminant material adhered to the surface of the heat transfer tube.

In order to solve the above problem of the conventional heat exchanger, a water fluidized bed heat exchanger is proposed. The water fluidized bed heat exchanger efficiently recovers a latent heat of a water vapor gas contained in the high temperature flue gas through the heat transfer tube while the flue gas which rises through a perforated plate fluidizes a water to exchange a heat with the heat transfer tube, thereby preventing lowering of the heat transfer efficiency of the heat transfer tube due to the corrosive flue gas or the low temperature corrosion phenomena due to adhesion of the contaminant material.

Despite the above advantages, the conventional water fluidized bed heat exchanger has a structural problem in that, when producing a hot water by recovering the waste heat, a temperature of a supply water cannot be raised more than about 55° C. which is a saturation temperature of a wet air in a water fluidized bed in which the high temperature flue gas and the water are fluidized such that the conventional water fluidized bed heat exchanger has disadvantages in that improving a heating efficiency of the combustion apparatus by the water fluidized bed heat exchanger is limited and applicability of the hot water is limited due to its temperature equal to or below the saturation temperature, thereby rendering it difficult to apply the water fluidized bed heat exchanger.

PRIOR ART REFERENCE (PATENT REFERENCE 1) Korean Patent Application Publication No. 10-2012-0020810 (published on Mar. 8, 2012)

(PATENT REFERENCE 2) Korean Patent No. 10-1118509 (issued on Feb. 14, 2012)

(PATENT REFERENCE 3) Korean Patent No. 10-0242226 (issued on Nov. 9, 1999)

(PATENT REFERENCE 4) Korean Patent No. 10-0213303 (issued on May 13, 1999)

SUMMARY OF THE INVENTION

Accordingly, the present invention has been made in view of the above problems, and an objective of the present invention is to provide a fluidized bed heat exchange apparatus in which a waste heat of a combustion flue gas containing a high temperature water vapor emitted from a combustion apparatus is subsequently passed through a water fluidized bed and a heat medium fluidized bed such that a latent heat of the combustion flue gas is recovered at the water fluidized bed and a hat water produced at a temperature less than a saturation temperature of a wet air is again heated at the heat medium fluidized bed, which does not have a vapor condensation phenomenon, thereby producing a hot water at a temperature higher than the saturation temperature of the wet air.

In accordance with an aspect of the present invention which achieves the above objectives and solves the disadvantages in the prior art, provided is a fluidized bed heat exchanger for recovering a heat of a combustion flue gas to produce a hot water at a high temperature, including: a compound fluidized bed heat exchanger in which a water fluidized bed formed on an upper perforated plate and a heat medium fluidized bed formed on a lower perforated plate are installed up and down, and a supply water which flows subsequently through an upper heat transfer tube and a lower heat transfer tube each installed on the water fluidized bed and the heat medium fluidized bed performs a heat exchange in multi stages by the water and the heat medium which are fluidized due to a high temperature flue gas discharged from an external combustion apparatus, to produce the hot water at the high temperature; and a fluidized medium tank for supplying and recovering the heat medium and the water, which are separately stored up and down due to a gravity difference respectively to/from the heat medium fluidized bed at a lower portion and the water fluidized bed at an upper portion of the compound fluidized bed heat exchanger.

In a preferable embodiment, the present invention may further include an upper demister for removing a droplet of the water installed at an upper portion of the water fluidized bed and a lower demister for removing a droplet of the heat medium installed at an upper portion of the heat medium fluidized bed.

In a preferable embodiment, the heat medium may be an absorbent including one of a heat medium oil, LiBr, or HCOOK, depending on an application.

In a preferable embodiment, a shape of the compound fluidized bed heat exchanger may have a rectangular prism structure, wherein a cylindrical flue gas outlet of which fuel passage area is reduced from a certain upper point to have a relatively small diameter may be formed.

In a preferable embodiment, the upper heat transfer tube may be configured to connect to the lower heat transfer tube through a heat transfer tube connecting pipe, and one side of the upper heat transfer tube may be configured to supply a lower temperature supply water through a supply water pump and a supply water pipe formed outside of the compound fluidized bed heat exchanger, and one side of the lower heat transfer tube which is not connected to the heat transfer tube connecting pipe may be configured to discharge a heat exchanged hot water of the high temperature through a hot water outlet pipe.

In a preferable embodiment, a water inlet may be formed at one side of the compound fluidized bed heat exchanger to supply the water to an upper portion of the water fluidized bed, and at one point below the water inlet, a water exit hole may be formed to recover an overflown water of the water fluidized bed to the fluidized medium tank.

In a preferable embodiment, a heat medium inlet may be formed at one side of the compound fluidized bed heat exchanger to supply the heat medium to an upper portion of the heat medium fluidized bed, and at one point below the heat medium inlet, a heat medium exit hole may be formed to recover an overflown heat medium of the heat medium fluidized bed to the fluidized medium tank.

In a preferable embodiment, a water storage unit may be formed at a lower portion of the fluidized medium tank, a heat medium storage unit for storing the heat medium having a gravity smaller than that of the water may be formed at an upper portion of the fluidized medium tank, and a fluidized medium connecting unit having a diameter smaller than diameters of the water storage unit and the heat medium storage unit may be formed between the water storage unit and the heat medium storage unit.

In a preferable embodiment, a heat medium outlet may be formed on one side of the heat medium storage unit and a heat medium recovery hole may be formed below the heat medium outlet such that the heat medium discharged through the heat medium outlet is supplied to the heat medium fluidized bed through a heat medium inlet pipe and a heat medium pump and an overflown heat medium of the heat medium fluidized bed is recovered to the heat medium recovery hole through a heat medium recovery pipe.

In a preferable embodiment, a water outlet may be formed at one side of the water storage unit, and a water recovery hole may be formed above the water medium outlet such that the water discharged through the water outlet is supplied to the water fluidized bed through a water supply pipe and a water pump and an overflown water of the water fluidized bed is recovered to a water recovery hole through a water recovery pipe.

As described above, the present invention is advantageous in that a high temperature combustion flue gas containing a water vapor is passed through a water fluidized bed to firstly recover a latent heat of the flue gas, thereby producing a hat water of about 55° C. which is a saturation temperature of a wet air, and the produced hot water is again passed through a heat medium fluidized bed to be heated, thereby secondly producing a hot water of a high temperature higher than about 80° C.

Also, the present invention is advantageous in that the water fluidized bed and the heat medium fluidized bed are formed between an array of heat transfer tubes installed at the water fluidized bed located at an upper part and the heat medium fluidized bed located at a lower part, thereby being capable of greatly improving heat transfer performance of a heat exchanger due to fluidization of a water and a heat medium.

Further, the present invention is advantageous in that a corrosive flue gas is fluidized due to the water and the heat medium to suppress concentration of a corrosive component such that a problem of a low-temperature corrosion at a surface of the heat transfer tube of a fluidized bed heat exchanger is solved as well as a self-cleansing effect at the surface of the heat transfer tube is achieved, and thus, the present invention has a great industrial applicability.

BRIEF DESCRIPTION OF THE DRAWINGS

The above and other objects, features and advantages of the present invention will be more clearly understood from the following detailed description taken in conjunction with the accompanying drawings, in which:

FIG. 1 is a schematic configuration view illustrating a fluidized bed heat exchange apparatus in which a water fluidized bed and a heat medium fluidized bed are formed in multiple layers according to an exemplary embodiment of the present invention.

DETAILED DESCRIPTION OF THE INVENTION

Hereinafter, exemplary embodiments of the present invention will be described herein below with reference to the accompanying drawings. Further, in the following description of the present invention, a detailed description of associated known functions or elements will be omitted when it may make the subject matter of the present invention rather unclear.

FIG. 1 is a schematic configuration view illustrating a fluidized bed heat exchange apparatus in which a water fluidized bed and a heat medium fluidized bed are formed in multiple layers according to an exemplary embodiment of the present invention.

The illustrated fluidized bed heat exchanger of the present invention includes a compound fluidized bed heat exchanger 1 in which a water fluidized bed 112 formed on an upper perforated plate 111 and a heat medium fluidized bed 114 formed on a lower perforated plate 113 are installed up and down, and a supply water which flows subsequently through an upper heat transfer tube 115 and a lower heat transfer tube 116 each installed on the water fluidized bed and the heat medium fluidized bed performs a heat exchange in multi stages by a water and a heat medium which are fluidized due to a high temperature flue gas discharged from an external combustion apparatus 3, to produce a hot water at a high temperature; and a fluidized medium tank 2 for supplying and recovering a heat medium and a water, which are separately stored up and down due to a gravity difference respectively to/from the heat medium fluidized bed at a lower portion and the water fluidized bed at an upper portion of the compound fluidized bed heat exchanger.

Depending on an application, an absorbent including one of a heat medium oil, LiBr, or HCOOK is used for the heat medium.

An upper demister 117 for removing a droplet of the water is installed at an upper portion of the water fluidized bed 112 and a lower demister 118 for removing a droplet of the heat medium is installed at an upper portion of the heat medium fluidized bed.

A shape of the compound fluidized bed heat exchanger 1 has a rectangular prism structure, wherein a cylindrical flue gas outlet 119 of which fuel passage area is reduced from a certain upper point to have a relatively small diameter is formed, thereby discharging the flue gas.

The upper heat transfer tube 115 is configured to connect to the lower heat transfer tube, and one side of the upper heat transfer tube is configured to supply a lower temperature supply water through a supply water pump and a supply water pipe formed outside of the compound fluidized bed heat exchanger, and one side of the lower heat transfer tube which is not connected to a heat transfer tube connecting pipe is configured to discharge a heat exchanged hot water of a high temperature through a hot water outlet pipe.

The high temperature flue gas emitted from the combustion apparatus 3 is introduced to a space formed at a lower portion of the lower perforated plate 113 through an air blower 31 and a flue gas inlet pipe 32 and through a flue gas inlet 121 formed at a lower portion of the compound fluidized bed heat exchanger, and then passes through a plurality of holes formed at the lower perforated plate 113 to fluidize the heat medium and exchange a heat with the lower heat transfer tube 116, and then passes through the lower demister 118 while passing through a plurality of holes formed at the upper perforated plate 111 in a state where the droplet of the heat medium is removed to fluidize the water and exchange a heat with the upper heat transfer tube 115, and is again discharged through the flue gas outlet 119 through the upper demister 117 in a state where the droplet of the water is removed.

The upper and lower heat transfer tubes are a heat transfer tube arranged in a horizontal direction or a vertical direction in multiple rows of more than two. Any arrangement method may be employed.

One side of the upper heat transfer tube 115 is configured to supply the low temperature water through a supply water pump 4 and a supply water pipe 41 formed outside of the compound fluidized bed heat exchanger.

The lower heat transfer tube 116 is configured to discharge the hot water of the high temperature through a hot water outlet pipe 42 at the other terminal which is not connected to a heat transfer tube connecting pipe 120. Here, the high temperature refers to a temperature of a hot water equal to or greater than 80° C., which is higher than 55° C., a saturation temperature of a wet gas raised into the water fluidized bed. An upper limit of a hot water temperature is different depending on a type of the heat medium and is about 100° C.~120° C. Importantly, in the present invention, producing a hot water of which temperature is equal to or greater than 80° C. is possible.

At one side of the compound fluidized bed heat exchanger 1, a water inlet 1121 is formed to supply the water to an upper portion of the water fluidized bed 112, and at one point below the water inlet 1121, a water exit hole 1122 is formed to recover an overflown water of the water fluidized bed to the fluidized medium tank 2.

At one side of the compound fluidized bed heat exchanger 1, a heat medium inlet 1141 is formed to supply the heat medium to an upper portion of the heat medium fluidized bed 114, and at one point below the heat medium inlet, a heat medium exit hole 1142 is formed to recover an overflown heat medium of the heat medium fluidized bed to the fluidized medium tank 2.

The fluidized medium tank 2 is configured such that the water and the heat medium are stored separately from each other by the gravity difference. To this end, in the fluidized medium tank 2, a water storage unit 21 is formed at a lower portion thereof, a heat medium storage unit 22 for storing a heat medium having a gravity smaller than that of the water is formed at an upper portion thereof, and a fluidized medium connecting unit 23 connecting between the water storage unit 21 and the heat medium storage unit 22 and having a diameter smaller than diameters of the water storage unit 21 and the heat medium storage unit 22 is formed. Here, the fluidized medium connecting unit has a concave shape because separation of the heat medium and the water is easy when a fuel passage has a reduced area and a longer height at a middle portion thereof. In other words, a height of a boundary layer between the heat medium and the water is easily changeable in response to a small degree of change.

A heat medium outlet 221 is formed on one side of the heat medium storage unit 22 and a heat medium recovery hole 222 is formed below the heat medium outlet 221. The heat medium outlet 221 is connected to the heat medium input 1141 though a heat medium inlet pipe 2211 and a heat medium pump 2212 to supply the heat medium and form the heat medium fluidized bed, and the heat medium recovery hole 222 is configured to be connected to the heat medium exit hole 1142 and a heat medium recovery pipe 2213 to recover the overflown heat medium of the heat medium fluidized bed.

A water outlet 211 is formed at one side of the water storage unit 21, and a water recovery hole 212 is formed above the water medium outlet. The water outlet 211 is connected to the water inlet 1121 through a water supply pipe 2111 and a water pump 2112, and the water recovery hole 212 is configured to be connected to the water exit hole 1122 and a water recovery pipe 2113 to recover the overflown water of the water fluidized bed.

In the above, a liquid recovered though the heat medium recovery hole 222 and the water recovery hole 212 may not be purely the heat medium or the water but a mixed liquid thereof; however, the water and the heat medium are separately stored in the fluidized medium tank 2 of the present invention by using the gravity difference and each storage unit does not have a closed and separate structure such that the water and the heat medium are separated due to the gravity difference after a certain period of time elapses, thereby always stably supplying the heat medium and the water.

An operation of the present invention configured as described above is described hereafter with reference to FIG. 1.

A high temperature flue gas containing a water vapor generated in the combustion apparatus 3 is provided to the flue gas inlet 121 of the compound fluidized bed heat exchanger 1 though the air blower 31 and the flue gas inlet pipe 32.

The flue gas supplied to the compound fluidized bed heat exchanger 1 passes through the lower perforated plate 113 to fluidize the heat medium of the heat medium fluidized bed 114, and in this case, performs heat exchange with the lower heat transfer tube 116 within the heat medium fluidized bed 114 to again heat the hot water within the heat transfer tube which is first raised to the upper heat transfer tube 115, thereby producing the hot water of the high temperature equal to or greater than 80° C. Here, the lower demister 118 is installed at an upper portion of the heat medium fluidized bed such that the droplet of the heat medium is not discharged upwardly and passes through the upper perforated plate 111.

Next, the flue gas passing through the upper perforated plate 111 passes through the upper heat transfer tube 115 installed within the water fluidized bed 112 and firstly heats the supply water at a low temperature supplied from the supply water pump 4 and then discharges the supply water through the upper demister 117 and through the flue gas outlet 119 in a state where the droplet of the water is not discharged upwardly.

The supply water at the low temperature firstly supplied to the upper heat transfer tube 115 is, after firstly being heated, supplied to the lower heat transfer tube 116 at a lower portion through the heat transfer tube connecting pipe 120. The temperature of the supply water is restricted to be under the saturation temperature of a wet air in the water fluidized bed, and the supply water passing through the water fluidized bed is secondly passes through an inside of the lower heat transfer tube within the heat medium fluidized bed, thereby producing the hot water of the high temperature. Here, the high temperature refers to a temperature equal to or higher than 80° C.

On the other hand, in order to stably form the water fluidized bed and the heat medium fluidized bed at the compound fluidized bed heat exchanger, the fluidized medium tank which supplies and recovers the water and the heat medium has the heat medium at an upper portion thereof and the water at a lower portion thereof. In this case, since a gravity of the heat medium is less than a gravity of the water, the heat medium and the water are separated within the fluidized medium tank due to the gravity difference.

In order to form the heat medium fluidized bed 114, the heat medium which is discharged though the upper heat medium outlet 221 of the fluidized medium tank 2 is supplied to the heat medium fluidized bed by the heat medium inlet pipe 2211 and the heat medium pump 2212. When the heat medium is continuously supplied to the heat medium fluidized bed, an upper surface of the heat medium fluidized bed is increased to be higher than a position of the heat medium exit hole 1142 such that an overflow occurs, and the overflown heat medium is again supplied to the heat medium recovery hole 222 of the heat medium tank. In the heat medium fluidized bed, the flue gas containing the water vapor is introduced at a lower portion thereof, and thus, a portion of the water vapor within the flue gas may be mixed with the heat medium. In this case, a water composition, together with the heat medium, is supplied to the heat medium recovery hole 222 of the fluidized medium tank, and the water composition included therein enters into the fluidized medium tank and then is separated by the gravity difference to sink down to a lower portion of the fluidized medium tank. Accordingly, by continuously supplying only the heat medium to the heat medium fluidized bed through the heat medium pump, the heat medium fluidized bed may be stably formed.

On the other hand, when a corrosive component within the flue gas enters into the heat medium fluidized bed 114, the corrosive component is mixed with the heat medium fluidized bed and contacts with a surface of the lower heat transfer tube. Also, together with the corrosive component, the water vapor within the flue gas is mixed with the heat medium fluidized bed and contacts with the surface of the lower heat transfer tube. In this case, the heat medium usually does not react with an acidic component and the water vapor, and only contributes to mixing of the fluidized bed. Therefore, a problem of low temperature corrosion can be solved similar to the water fluidized bed. In other words, there exists no concentration due to condensation of the acidic component within the heat medium fluidized bed, and the water vapor component within the flue gas has an effect of cleansing the concentration, thereby solving the problem of the low temperature corrosion.

Also, in order to form the water fluidized bed 112, a water stored at the lower water storage unit 21 of the fluidized medium tank 2 is discharged through the water outlet 211 and then is supplied to the water fluidized bed 112 by using the water supply pipe 2111 and the water pump 2112. When the water is continuously supplied to the water fluidized bed and the water vapor in the flue gas is condensed at the water fluidized bed 112 of a low temperature and the upper heat transfer tube 115, an upper surface of the water medium fluidized bed is increased to be higher than a position of the water exit hole 1122 such that an overflow occurs, and the overflown water is again supplied to the water recovery hole 212 of the lower water storage unit 21 of the fluidized medium tank.

Since the flue gas containing a portion of the heat medium is introduced to the water fluidized bed at a lower portion thereof, the heat medium within the flue gas may be mixed with the water of the water fluidized bed. In the case, a heat medium component, together with the water, is supplied to the water recovery hole 212 of the fluidized medium tank, and the heat medium component included therein which enters into the fluidized medium tank is separated due to the gravity difference and rises to an upper portion of the fluidized medium tank. Accordingly, by continuously supplying only water to the water fluidized bed through the water pump, the water fluidized bed may be stably formed.

While the present invention has been shown and described with reference to certain embodiments thereof, it will be understood by those skilled in the art that various changes in form and details may be made therein without departing from the spirit and scope of the present invention as defined by the appended claims.

DESCRIPTION OF SYMBOLS (1): compound fluidized bed heat exchanger (2): fluidized medium tank
(3): combustion apparatus (4): supply water pump
(21): water storage unit (22): heat medium storage unit
(23): fluidized medium connecting unit (31): air blower
(32): flue gas inlet pipe (41): supply water pipe
(42): hot water outlet pipe (111): upper perforated plate
(112): water fluidized bed (113): lower perforated plate
(114): heat medium fluidized bed (115): upper heat transfer tube
(116): lower heat transfer tube (117): upper demister
(118): lower demister (119): flue gas outlet
(120): heat transfer tube connecting pipe (121): flue gas inlet
(211): water outlet (212): water recovery hole
(221): heat medium outlet (222): heat medium recovery hole
(1121): water inlet (1122): water exit hole
(1141): heat medium inlet (1142): heat medium exit hole
(2111): water supply pipe (2112): water pump
(2113): water recovery pipe (2211): heat medium inlet pipe
(2212): heat medium pump (2213): heat medium recovery pipe

What is claimed is:
1. A fluidized bed heat exchanger for recovering a heat of a combustion flue gas to produce a hot water, comprising:
a compound fluidized bed heat exchanger including
a lower perforated plate having a plurality of holes therein and disposed in a lower side of the compound fluidized bed heat exchanger,
a first space formed between the lower perforated plate and a bottom surface of the compound fluidized bed heat exchanger,
a heat medium fluidized bed formed on the lower perforated plate and including a heat medium,
an upper perforated plate having a plurality of holes therein and disposed over the heat medium fluidized bed,
a second space formed between the upper perforated plate and the heat medium fluidized bed,
a water fluidized bed formed on the upper perforated plate and including a first water,
a flue gas inlet disposed in the lower side of the compound fluidized bed heat exchanger such that the combustion flue gas is introduced into the first space through the flue gas inlet,
a flue gas outlet disposed in a top of the compound fluidized bed heat exchanger and discharging the combustion flue gas passed through the heat medium fluidized bed and the water fluidized bed,
a third space formed between the water fluidized bed and the flue gas outlet,
an upper heat transfer tube installed inside the water fluidized bed, and
a lower heat transfer tube installed inside the heat medium fluidized bed;

a supply water pipe formed outside of the compound fluidized bed heat exchanger and connected to the upper heat transfer tube;

a hot water outlet pipe formed outside of the compound fluidized bed heat exchanger and connected to the lower heat transfer tube, wherein a supply second water flows through the supply water pipe, the upper heat transfer tube, the lower heat transfer tube and the hot water outlet pipe;

a fluidized medium tank disposed spaced from the compound fluidized bed heat exchanger and supplying and recovering the heat medium and the first water, respectively, to/from the heat medium fluidized bed and the water fluidized bed of the compound fluidized bed heat exchanger, the fluidized medium tank including a water storage unit formed at a lower portion of the fluidized medium tank and storing the first water, a heat medium storage unit formed at an upper portion of the fluidized medium tank and storing the heat medium, and a fluidized medium connecting unit having a diameter smaller than diameters of the water storage unit and the heat medium storage unit and formed between the water storage unit and the heat medium storage unit;

a first water supply pipe supplying the first water from the water storage unit of the fluidized medium tank to the water fluidized bed and connected between a first water outlet disposed in a lower side of the water storage unit and a first water inlet disposed in an upper side of the compound fluidized bed heat exchanger, the first water inlet being disposed such that the first water is supplied to the third space;

a first water recovery pipe recovering the first water overflowing the water fluidized bed to the water storage unit of the fluidized medium tank and connected between a first water recovery hole disposed in an upper side of the water storage unit and a first water exit hole disposed in the upper side of the compound fluidized bed heat exchanger, the first water exit hole being disposed below the first water inlet;

a heat medium inlet pipe supplying the heat medium from the heat medium storage unit of the fluidized medium tank to the heat medium fluidized bed and connected between a heat medium outlet disposed in a middle side of the heat medium storage unit and a heat medium inlet disposed in a middle side of the compound fluidized bed heat exchanger, the heat medium inlet being disposed such that the heat medium is supplied to the second space; and a heat medium recovery pipe recovering the heat medium overflowing the heat medium fluidized bed to the heat medium storage unit of the fluidized medium tank and connected between a heat medium recovery hole disposed in a lower side of the heat medium storage unit and a heat medium exit hole disposed in the middle side of the compound fluidized bed heat exchanger, the heat medium exit hole being disposed below the heat medium inlet.

2. The fluidized bed heat exchanger of claim 1, further comprising:

an upper demister removing a droplet of the first water and installed between the flue gas outlet and the water fluidized bed; and a lower demister removing a droplet of the heat medium and installed in the second space.

3. The fluidized bed heat exchanger of claim 1, wherein the heat medium is an absorbent including a heat medium oil or LiBr.

4. The fluidized bed heat exchanger of claim 1, wherein the compound fluidized bed heat exchanger has a rectangular prism shape, and the flue gas outlet has a relatively small diameter.

5. The fluidized bed heat exchanger of claim 1, wherein the heat medium recovery hole is formed below the heat medium outlet such that the heat medium discharged through the heat medium outlet is supplied to the heat medium fluidized bed through heat medium inlet pipe and the overflown heat medium of the heat medium fluidized bed is recovered to the heat medium recovery hole through the heat medium recovery pipe.

6. The fluidized bed heat exchanger of claim 1, wherein the first water recovery hole is formed above the first water medium outlet such that the first water discharged through the first water outlet is supplied to the water fluidized bed through the first water supply pipe and the overflown water of the water fluidized bed is recovered to the first water recovery hole through the first water recovery pipe.

* * * * *